United States Patent [19]

Veldhuizen et al.

[11] 4,453,874

[45] Jun. 12, 1984

[54] ARTICLE-HANDLING APPARATUS

[75] Inventors: Harmen Veldhuizen, Vlaardingen; Hendrik Streefkerk, Bergschenhoek; Gerhard Van Der Tas, Hoek van Holland, all of Netherlands

[73] Assignee: Internationale Octrooi Maatschappij "Octropa" BV, Rotterdam, Netherlands

[21] Appl. No.: 452,407

[22] Filed: Dec. 22, 1982

[51] Int. Cl.³ .............................................. B65G 59/02
[52] U.S. Cl. .................................... 414/123; 198/518;
271/10; 414/77; 414/117; 414/659
[58] Field of Search ................... 414/76, 77, 112, 114,
414/117, 118, 123, 124, 495, 659; 198/313, 518,
198/812; 271/10, 11, 12, 95

[56] References Cited

U.S. PATENT DOCUMENTS

| 3,070,241 | 12/1962 | Johnston | 414/118 |
| 3,401,811 | 9/1968 | Gräsvoll | 414/112 |
| 3,749,257 | 7/1973 | Yamashita | 414/118 |

FOREIGN PATENT DOCUMENTS

| 2622781 | 12/1977 | Fed. Rep. of Germany | 414/114 |
| 948472 | 2/1964 | United Kingdom | 414/114 |

Primary Examiner—Leslie J. Paperner
Attorney, Agent, or Firm—Cushman, Darby & Cushman

[57] ABSTRACT

An apparatus for removing articles such as boxes from pallets and for placing articles on pallets too, comprising a frame, a mainly horizontal supporting surface, a plurality of parallel supporting fingers which are longitudinally slidably supported in said frame and yieldably biased in their extended position. The fingers are each provided with a driven roller at their extending extremity. The supporting surface is formed by a plurality of parallel conveyor belts extending parallel to the fingers.

5 Claims, 3 Drawing Figures

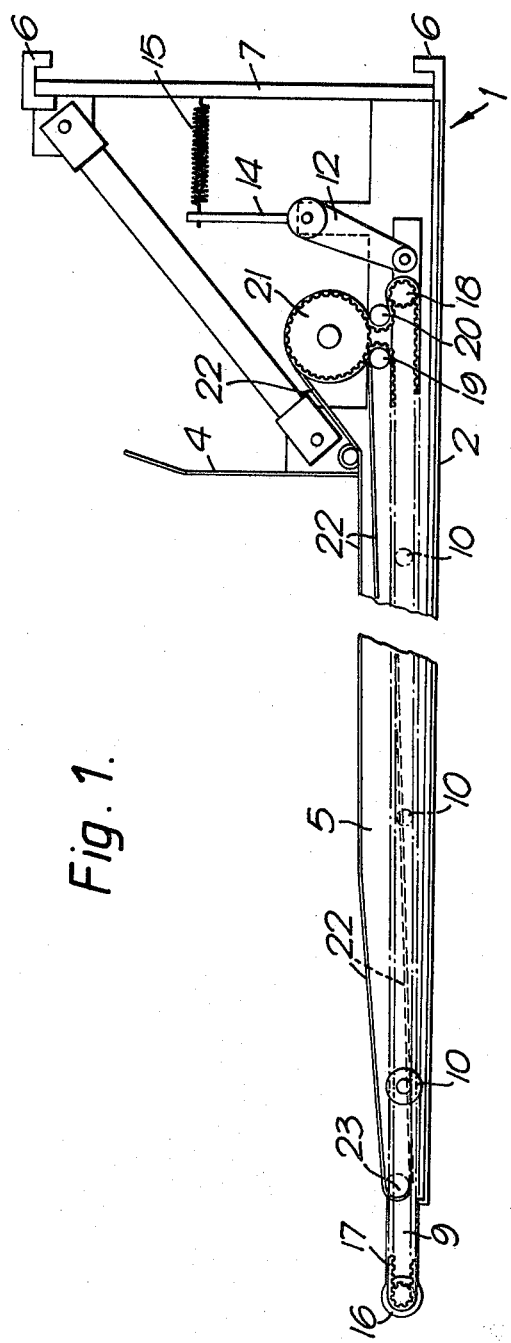
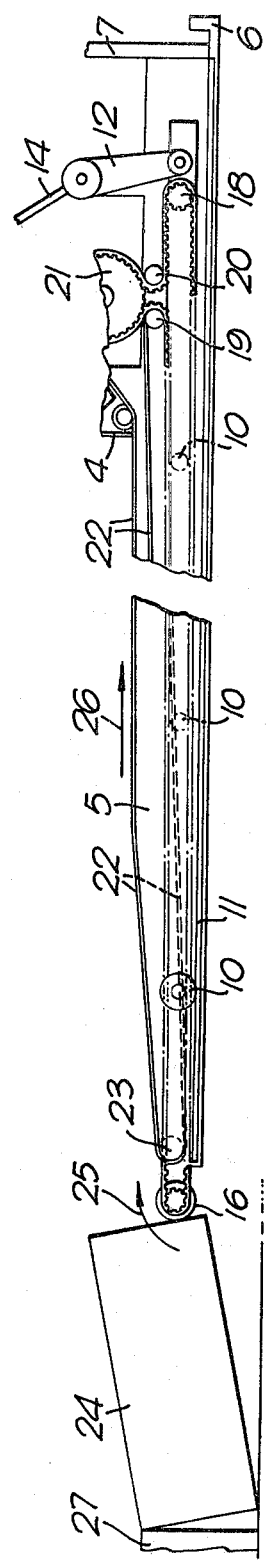
Fig. 1.
Fig. 1A.

ARTICLE-HANDLING APPARATUS

BACKGROUND OF THE INVENTION

The invention relates to an article-handling apparatus and particularly to an apparatus for loading and emptying pallets. Article-handling apparatus have been provided heretofore for automatically placing articles like boxes on a pallet and for removing such articles from a pallet. Such apparatus can comprise a slide, movable horizontally towards and away from a stack of packages, a movable driven surface, defined by a roller rotatable about a horizontal axis, the roller being resiliently mounted on the slide and a driven conveyor means mounted on the slide for conveying the packages lifted by the roller.

While these apparatus could be used for stacking articles on and destacking articles from pallets, difficulties could be met when the articles were irregularly stacked, of uneven shape or when the apparatus where not moved perpendicular to the facing side wall of the articles.

The object of the invention is to provide an article-handling apparatus of the type mentioned that can more reliably remove packages from a loaded pallet without damaging the packages. Another object of the invention is to provide an improved article-handling apparatus which can easily be used.

Other and further objects and advantages of the invention will become apparent from the following description taken in connection with the accompanying drawings.

SUMMARY OF THE INVENTION

The present invention improves upon the prior art in its provision of a modified apparatus for stacking and destacking articles. The apparatus of the invention is provided with a plurality of parallel supporting fingers which are longitudinally slidably supported in the frame of the apparatus under a supporting surface for the articlrs, which fingers are yieldably biased in their extended position and each are provided with a driven pick up roller at their extending extremity. The supporting surface of this apparatus is formed by a plurality of parallel conveyor belts extending parallel to and between the fingers.

BRIEF DESCRIPTION OF THE DRAWINGS

FIG. 1 is a more or less diagrammatic vertical section, taken on line I—I of FIG. 2, of an article-handling apparatus of the invention, FIG. 1A is a fragment of section of FIG. 1 showing a position of the apparatus during a pallet-unloading operation.

DESCRIPTION OF THE PREFERRED EMBODIMENT

Figure 2:
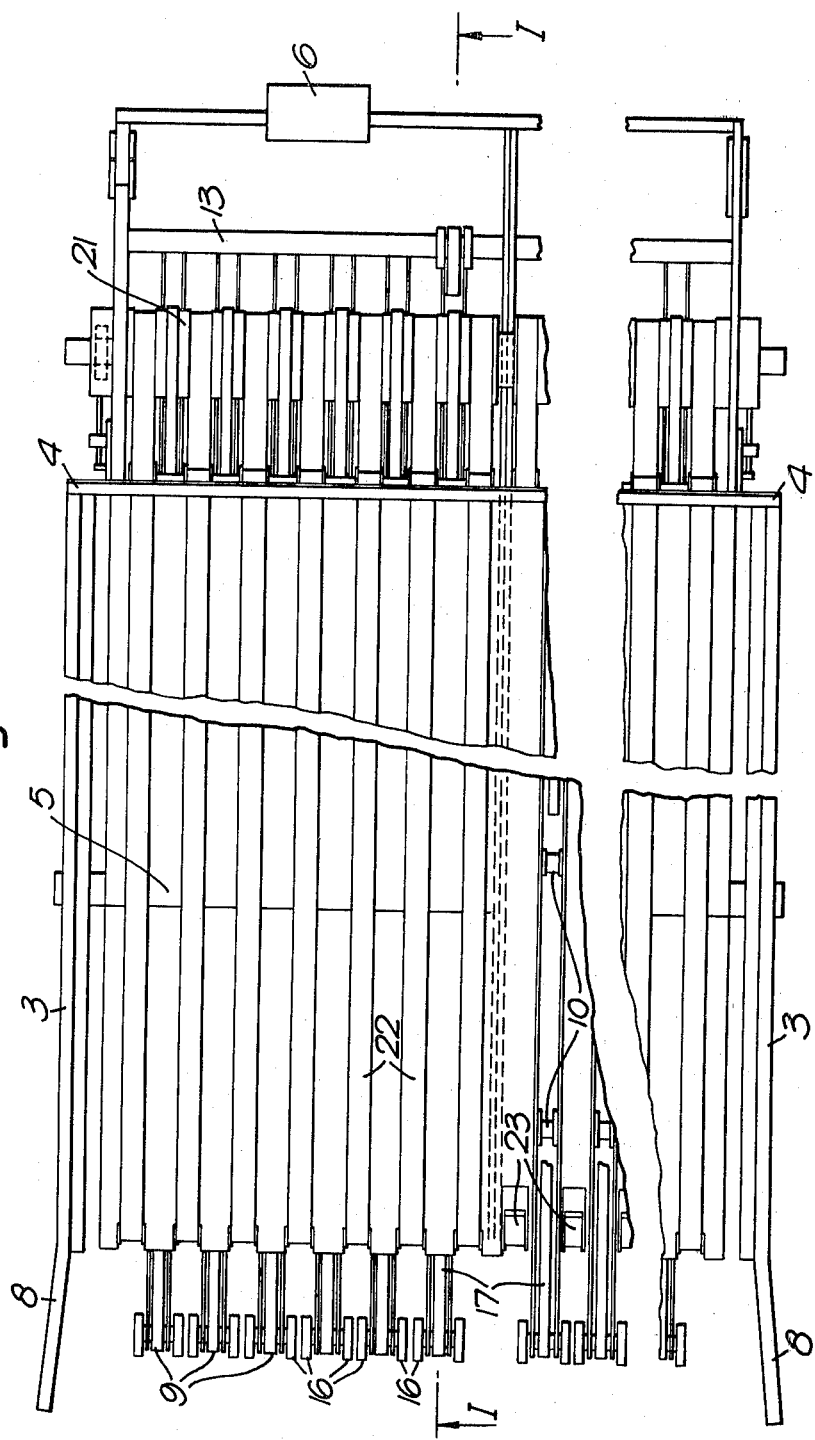
FIG. 2 is a plan view, partly broken away, of the apparatus of the present invention.

The embodiment of the depalletizing machine of the present invention shown in the figures comprises in general a frame support structure 1 having a base 2, a pair of side guides 3 for guiding and protecting the articles to be handled, a back plate 4, a support plate 5 and connecting means such as hooks 6 for connecting the machine to a traction vehicle such as a lift truck.

The mainly rectangular frame support structure 1 has the hooks 6 at the rear end, connected to suitably shored uprights 7. At some distance from the rear end, the back plate 4 is erected, defining the rear end of the mainly horizontal support plate 5. At the lateral sides of the support plate, low side guides 3 are arranged, extending somewhat beyond the front end of the support plate with flaring ends 8.

Under the support plate 5 a plurality of slidable supporting fingers 9 is arranged with their free ends extending beyond the front edge of the support plate.

The fingers are supported by rolls 10 running on suitable rails 11 underneath the support plate. The rear end of each finger is rotatably connected to a pivot link 12, fixed to a common cross bar 13 carrying a lever 14 which is biased by spring 15 towards the rear of the apparatus.

The free end of each finger 9 carries a pick-up roller 16 which is driven by a toothed belt 17 running along the length of each finger around an idle return roller 18 near the other end of each finger and two guide rollers 19 and 20, respectively, arranged between the pick-up roller 16 and the return roller 18. The lowermost generatrices of the guide rollers and the uppermost ones of the pick-up and the return rollers are lying in one plane. An upward loop of the toothed belt 17 between these guide rollers is running around a common transverse driving roll 21, which may derive its driving energy from any suitable source, such as a traction vehicle.

The toothed belts 17 are each arranged between two conveyor belts 22, the upper runs thereof being supported by the support plate 5. These conveyor belts are guided around guiding rolls 23 at the front end of the support plate 5, underneath the support plate towards the driving roll 21 and again across the upper surface of the support plate 5. The surface of these belts contacting the support plate 5 is relatively slipping or abhesive when compared with the upper surface of these belts.

When taking up articles, like boxes, from a loaded pallet, the apparatus is gently pushed against these boxes 24, in such a way that the pick-up rolls are brought into frictional contact with one of the side walls of these boxes. The apparatus in moved forward, whereby the fingers 9 are moving backwards against the spring bias as shown in FIG. 1A. During this operation the driving roll 21 is driven so that the pick-up rollers 16 are rotating as indicated by the arrow 25. As soon as the friction between these rollers and the boxes 24 is sufficient, the boxes are tilted and the apparatus can be moved under the boxes, which boxes now are conveyed on the upper runs of the conveyor belts 22 running in the direction of the arrow 26. Thereafter a next box 27 or row of boxes may be picked up.

The boxes picked up by the apparatus may be removed therefrom by simply reversing the sense of rotation of the driving roll 21 and bringing the pick-up rollers just above any suitable surface for receiving the boxes.

We claim:

1. An apparatus for handling articles comprising a frame, a mainly horizontal supporting surface, a plurality of parallel supporting fingers which are longitudinally slidably supported in said frame under the supporting surface and yieldably biased in their extended position, each being provided with a driven pick-up roller at their extending extremity, while the supporting surface is formed by a plurality of parallel conveyor belts extending parallel to and between the fingers.

2. The apparatus of claim 1, characterized in that the conveyor belts are slipping on one side and relatively non-slipping on the other, the slipping side facing a surface supporting the belts.

3. The apparatus of claim 1, characterized in that the rollers are driven by toothed belts, each toothed belt being arranged between two conveyor belts.

4. The apparatus of claim 3, characterized in that the conveyor belts and the toothed belts are driven by a common driving roll.

5. The apparatus of claim 3, characterized in that a driving means for the toothed belts is arranged above the fingers, near to the rear ends thereof, the toothed belts are guided around the pick-up rollers at one end of the fingers, return rollers at the other end of the fingers and two guide rollers arranged between the pick-up and the return rollers, the lowermost generatrices of the guide rollers and the uppermost ones of the pick-up and the return rollers lying in one plane.

* * * * *